Patented June 24, 1930

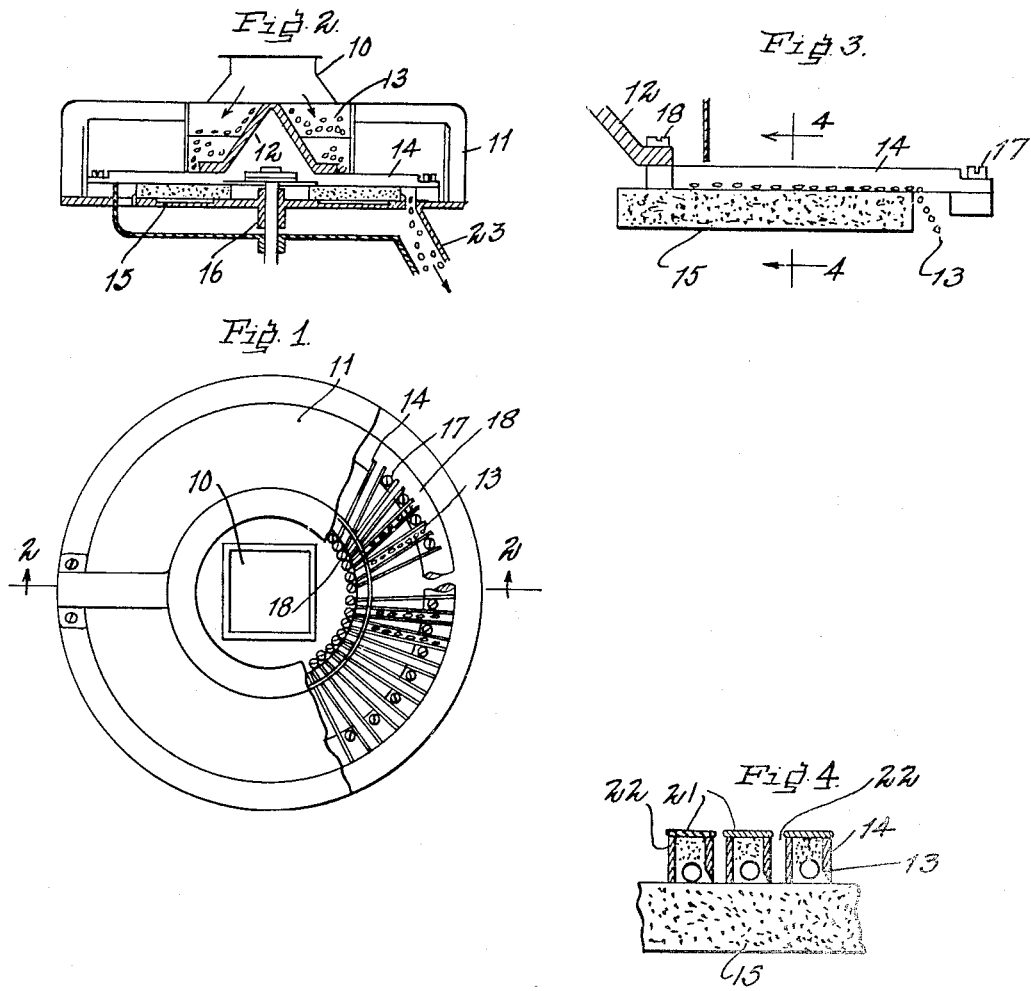

1,766,513

UNITED STATES PATENT OFFICE

JOSEF HELLER, OF VIENNA, AUSTRIA

DECORTICATING MACHINE

Application filed September 19, 1928, Serial No. 306,894, and in Austria October 22, 1927.

This invention relates to improvements in decorticating machines, particularly in machines for hulling and scouring food material of the grain form, and more particularly rice and oats, and it is the principal object of my invention to provide a machine of this character to effectively and expeditiously scour the single grains in the direction of their longitudinal axis, as they are arranged in rows in parallel cells and subjected to the action of the rotating grinder from the bottom of parallel cells, so that the grains during the scouring or hulling action turn about their own longitudinal axis so as to be uniformly hulled and polished without any injury to the kernel or breaking of the same which is particularly important with the decorticating of rice to avoid the high ratio of broken rice resulting in machines of the known construction.

A further object of my invention is the provision of a decorticating machine equipped with a brush or rubber wiper, adapted to remove the shells to avoid mixing thereof with the hulled grain.

A still further object of my invention is the provision of a grain or rice decorticating apparatus allowing an adjustment of the cell walls and a formation of the same to engage the grain with the grinder under a certain pressure.

These and other objects of my invention will become more fully known as the description thereof proceeds, and will then be specifically defined in the appended claims.

In the accompanying drawing forming a material part of this disclosure:

Fig. 1 is a top plan view of a guide disc for the grain, the cover therefor being partly broken away to illustrate the interior construction.

Fig. 2 is a section on line 2—2 of Figure 1.

Fig. 3 is an enlarged sectional detail view of one of the grain cells.

Fig. 4 is a section on line 4—4 of Figure 3.

As illustrated the grain to be fed to the grinders is entered through a hopper 10 into a casing 11 equipped in its center with a cone 12 over the mantle of which the material 13 is rolling down and distributed into the single cells 14, arranged parallel to each other and radially disposed to the center. The bottom of each cell is open and allows an exposure of the material to the rotating grinding disc or stone 15 turning about the vertical axle 16 receiving its rotation from any desired motive force or machinery.

The outer ends of the cells are separated by means of screws 17 or the like entering a seat 18 in the bottom of casing 11, while the inner ends are secured by means of screws 18 to the lower flange of the cone-shaped body 12.

As shown in Figure 4, the cells 14 are provided with covers 21 arranged parallel to the grinding surface, and equipped at their lower face with wipers 22 made of rubber or with suitable brushes adapted to sweep the shells loosened during the grinding action into the air channels 22' provided between the cell walls. The grain is removed through a discharge channel 23 or the like.

The operation of my device will be entirely clear from the above description by simultaneous inspection of the drawing, and it will be clear that the material to be hulled is fed to the cells in alignment so as to be subjected to the action of the grinder simultaneously in a plurality of grains while it is kept with a slight pressure against the grinder, the rotation of which will rotate the single grains in their cells so as to ensure a uniform hulling and shelling.

An adjustment of the cell walls to suit various sizes of grain, rice, etc., will be possible by suitably adjusting screws 17, 18 or 19.

It is to be understood that I have described and illustrated the preferred form of my device only as an example of the many ways in which my device may be practically constructed, and that I may make such changes in its general arrangement and in the construction of the minor details as come within the scope of the appended claims without departure of my invention and the principles involved.

Having thus described my invention what

I claim as new and desire to secure by Letters Patent is:—

1. A decorticating machine, comprising in combination with a revolving grinder, a means for subjecting the material to be hulled in a plurality of separated rows to the action of the grinder in the direction of the longitudinal axis of the material.

2. In a decorticating machine a plurality of radial material receiving cells each having an open bottom, a grinder closing said bottom to hull the material in said cell rotated therein about its longitudinal axis during the rotation of said grinder.

3. In a decorticating machine including a rotating grinding disc or stone, a hopper for feeding the material to the grinding means, a casing, a conical body in the center of said casing having a lower flange and allowing a rolling of the material down its mantle, a plurality of cells radially disposed to the center of said cone, and having each an open bottom to allow exposure of the material to said grinder, a seat in the bottom of said casing, means for adjustably securing the outer ends of said cells to the seat in the bottom of said casing, and means for adjustably securing the inner ends of said cells to the lower flange of said casing.

Signed at Vienna, Austria, this 28th day of August, A. D. 1928.

JOSEF HELLER.